Figure 1:
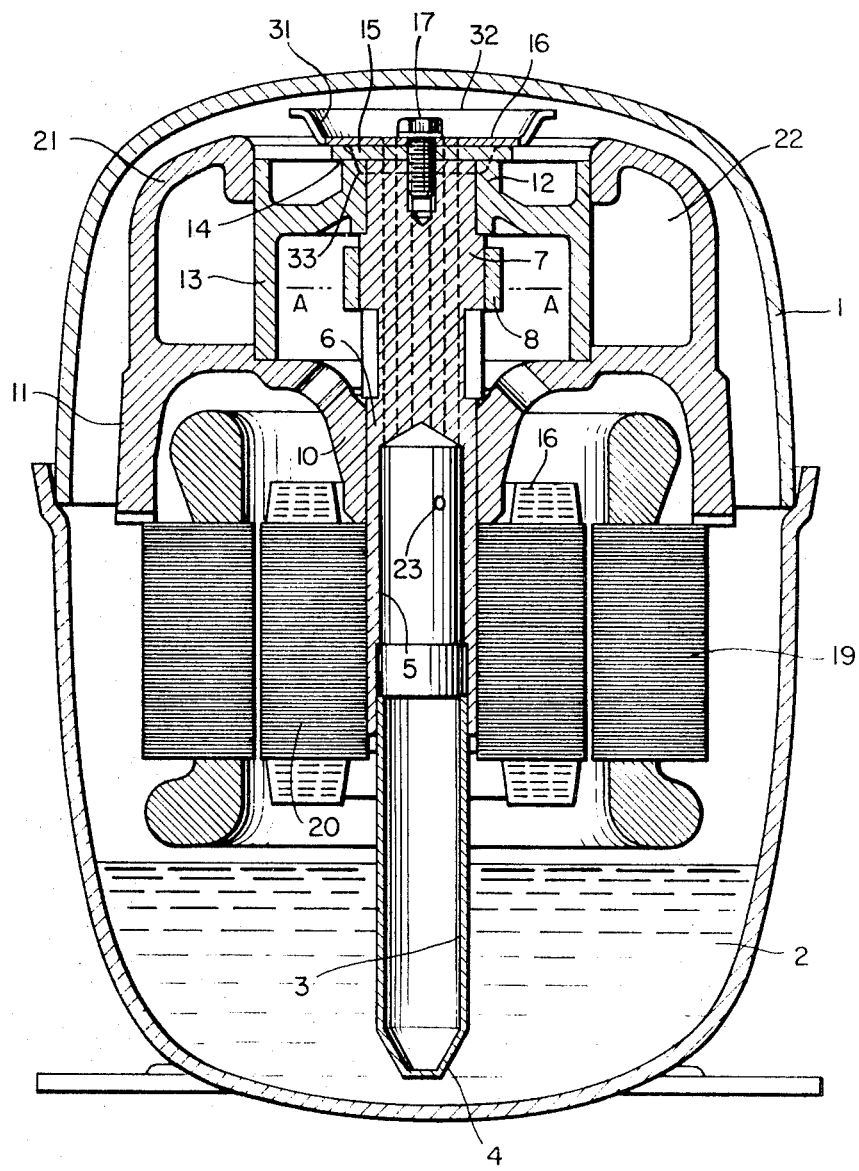

United States Patent

[11] 3,587,343

[72] Inventors Heinz Mahncke
Sonderborg;
Knud Vagn Valbjorn, Nordborg, Denmark
[21] Appl. No. 836,013
[22] Filed June 24, 1969
[45] Patented June 28, 1971
[73] Assignee Danfoss A/S, Nordborg, Denmark

[54] MOTOR-COMPRESSOR
5 Claims, 5 Drawing Figs.
[52] U.S. Cl. .................................................. 74/603
[51] Int. Cl. .................................................. G04g 3/00
[50] Field of Search .......................................... 230/58,
172, 206; 74/573, 603; 417/372, 415, 363

[56] References Cited
UNITED STATES PATENTS
3,104,051 9/1963 Herring et al. ................. 230/206

3,125,184 3/1964 Valbjarr ..................... 230/206X

Primary Examiner—Robert M. Walker
Attorney—Wayne B. Easton

ABSTRACT: The invention relates to a motor-compressor assembly of the type used for small refrigerating machines. The assembly has a vertical crankshaft arrangement with a carrier frame being formed with radial and axial thrust bearings to provide lateral and vertical support for the crankshaft. A detachable bearing member is attached to the upper portion of the crankshaft which has an annular bearing surface for engagement with said axial thrust bearing and compensating weight means for counterbalancing the crank portion of the crankshaft.

MOTOR-COMPRESSOR

The invention relates to a motor compressor incorporating a crank and a shaft arrangement comprising a compensating weight, the compressor being intended in particular for use in small encased refrigerating machines having vertical shafts.

Numerous constructions of compressor are known in which a compressor piston is driven through the crank. The compensating weight is normally formed as a counterweight directly on the one-piece motor crankshaft and, in most cases, on that side of the crank facing the rotor. However, difficulties always occur in providing a sufficiently large compensating weight, since the space around the shaft is limited. Furthermore, reliance has to be placed upon each crankshaft providing balanced operation after its manufacture; any unevenness subsequently observed cannot be eliminated.

The object of the invention is to provide a motor compressor of the above-described kind, in which the problem of dynamic balancing is solved in a considerably better manner than hitherto.

According to the invention, this object is achieved by securing to one end face of the shaft a disc which, outside an annular portion extending beyond the diameter of the shaft and forming an axial bearing, has an additional part ring as a compensating weight on the side opposite the crank.

In this arrangement, the compensating weight is combined with an axial bearing in such manner that the center of gravity of the compensating weight is located at a relatively great distance from the axis of rotation of the shaft. Consequently, a relatively small weight suffices; since the weight is located at an end face of the shaft, the disc can also be made to any thickness and thus suited to the compensating weight required.

A further possible way of suiting the compensating weight consists in securing at least one further annular portion on the part ring. In this way, a single type of axial bearing disc can be related to a plurality of different crankshafts.

Expediently, the axial bearing is formed at the end face of a radial bearing and the further annular portion surrounds the radial bearing bush. In this manner the axial dimension of the construction is reduced. Also, the end face of the compressor housing can be set back around the radial bearing bush to form an annular recess. The compensating weight arrangement is then well protected against mechanical damage.

In a preferred form of construction, the disc is detachably secured to the end face of the shaft, for example by means of a screw. This creates the possibility of exchanging the disc for one having a different compensating weight.

It is particularly advantageous if a further compensating weight is provided on the rotor by creating an enlarged portion on the short-circuiting ring facing the crank and on that side of the ring opposite the crank.

This constitutes a simple method of providing a compensating weight on each side of the crank, thus achieving particularly good balancing. The motor crankshaft itself does not need to carry any compensating weight at all. Therefore, depending upon circumstances, the crank bearing can be pushed on from either end of the shaft if, between the middle portion of the shaft and the crank, there is present a neck portion of smaller cross section, which enables the crank bearing to be radially offset.

Figure 2:
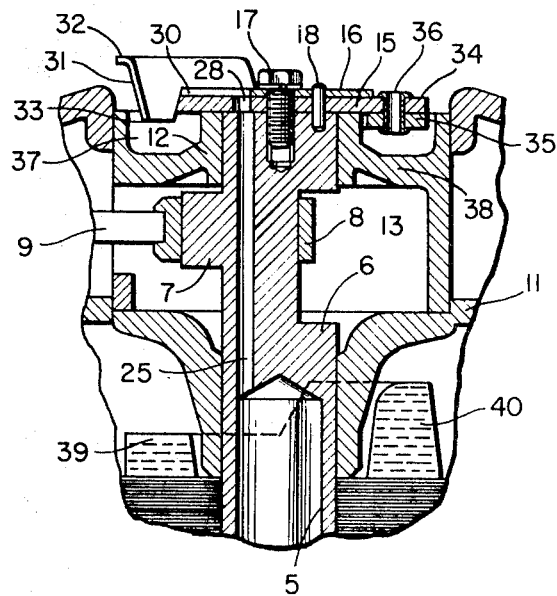
Figure 5:
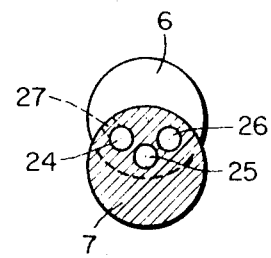
Figure 3:
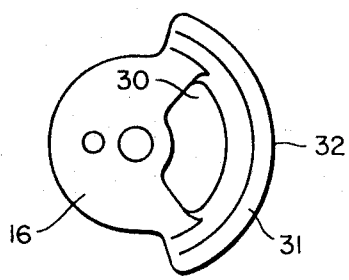
Figure 4:
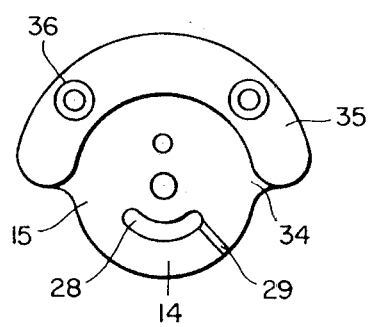

An embodiment of the invention will now be described in some detail by reference to the drawing, in which:

FIG. 1 shows a longitudinal section through a motor compressor in accordance with the invention, FIG. 2 shows a central partial section through the upper end of the motor compressor on a plane at right angles to that of FIG. 1, FIG. 3 is a view from below of the centrifuging disc used, FIG. 4 is a view from below of the axial bearing disc employed, and FIG. 5 shows a section through the motor crankshaft, on the line A-A of FIG. 1.

The motor compressor is mounted in a case 1 by means of springs, not illustrated. In the lower part of the case is an oil sump 2. An oil delivery pipe 3, the lower end of which is formed as a hollow cone 4, extends into this sump. The delivery pipe 3 is pressed into a bore 5 in a motor shaft 6, which drives a compressor piston, not illustrated, through a crank 7, a crank bearing 8 and a connecting rod 9. The shaft 6 is supported in a first radial bearing 10, which is formed in the carrier element 11 for the motor, and in the second radial bearing 12, which is formed in an insert 13 in the carrier member 11. An axial bearing is formed by the underside 14 of a disc 15 secured to the end face of the shaft 6, in conjunction with the upper end face of the radial bearing bush 12. Above this is located a centrifuging disc 16. The two discs 15 and 16 are detachably secured to the shaft 6 by means of a screw 17 and are held against rotation with the help of a pin 18. The motor consists of a stator 19, connected to the carrier member 11, and a rotor 20 connected to the shaft. The upwardly extending wall 21 of the carrier member 11, together with the insert 13, forms noise-reducing chambers 22.

The oil delivered by the pipe 3 rises in the bore 5 of the shaft 6; part of it is deflected through a bore 23 for the lubrication of the radial bearing 10. The rest passes farther upwards through three axially parallel bores 24, 25 and 26, the positions of which can be seen from FIG. 5. Oil is diverted through a transverse bore 27 for lubricating the crank bearing 8. The oil emerging from the three bores 24, 25 and 26 passes into an opening 28 in the disc 15. From here, oil can be distributed through a radially extending groove 29 over the surface of the axial bearing at the underside 14 of the disc. The rest of the oil passes through a cutaway portion 30 in the edge of the centrifuging disc to the edge 31 thereof and is flung on to the wall of the casing by the rim 32.

As FIG. 3 shows, the centrifuging disc 16 has an upwardly inclined edge 31 over only somewhat less than half of its circumference and on that side where the three bores 24, 25 and 26 run out of the end face of the shaft 6. The lower rim 33 of the edge 31 is located below the underside 14 of the disc 15. The rim 32 is positioned above the end face of the shaft arrangement, i.e. of the cutaway portion 30 in the centrifuging disc 16, and also above the upper end face of the carrier member 11; consequently, the oil emerging near the axial bearing is caught and passed to the wall of the case, although this point is positioned below the end face of the carrier member.

The disc 15 is provided on the side opposite the crank with an additional part ring 34 to which is also fitted, by means of rivets 36, a further annular portion 35.

For the sake of clarity, one of the rivets 36 is sectioned in FIG. 2. In this way there is created a compensating weight by means of which the imbalance caused by the crank 7 can be offset. Around the upper radial bearing bush 12 is located an annular space 37 in which a portion 38 of the end face of the insert 13 is set back. This annular space can accommodate not only the one further annular portion 35 illustrated, but, if required, a second such portion. It is clear that these annular portions do not lie precisely opposite to the edge 31 of the centrifuging disc, so that the two parts cannot collide with each other.

For the purpose of further balancing of weight, the upper short-circuiting ring 39 of the rotor 20 is provided with an enlarged portion 40 over half of its circumference on the side opposite the crank. In this way a compensating weight is provided above and below the crank 7, so that the arrangement has extremely little imbalance.

The disc 15 can be fitted after the motor compressor has been assembled. There is no difficulty in adding additional weights or in achieving optimum dynamic balance by changing one disc for another.

In assembling the system, the crankshaft is pushed up onto the shaft 16 from below and is offset radially in the neck portion located below the crank 7 to an extent such that it can be pushed onto the crank. The shaft is then fitted on to the carrier member 11 from above and the rotor 21 is pressed on from below. The cup-shaped insert 13 is then pressed into the carrier member 11 from above, and finally the bearing disc 15 and the centrifuging disc 16 are screwed on tight at the top.

We claim:

1. A motor-compressor assembly comprising a casing, a carrier frame disposed internally of said casing, said frame defining a radial bearing and an upper axial bearing, a shaft rotatably journaled in said radial bearing, a shaft-supporting disc member attached to said shaft and engaging said axial bearing, said shaft having a crank portion between said bearings, said shaft-supporting disc member having compensating weight means extending radially therefrom in the opposite direction relative to said crank portion.

2. A motor-compressor assembly according to claim 1 including a lubricating disc member attached to the upper side of said shaft-supporting disc member.

3. A motor-compressor assembly according to claim 1 wherein a second radial bearing is contiguous with said axial bearing, said second radial bearing being radially inwardly relative to said compensating weight means.

4. A motor-compressor assembly according to claim 1 wherein said frame defines an annularly shaped recess surrounding said axial bearing.

5. A motor-compressor assembly according to claim 4 wherein second compensating weight means is attached to the lower side of said shaft-supporting disc member, said second compensating weight means being at least partially within the confines of said annularly shaped recess.